United States Patent
Wunsche, III et al.

(10) Patent No.: US 11,301,949 B2
(45) Date of Patent: Apr. 12, 2022

(54) INTEGRATED TRANSPORTATION SERVICES FOR VEHICLE-SHARING FLEET

(71) Applicants: DENSO International America, Inc., Southfield, MI (US); DENSO CORPORATION, Kariya (JP)

(72) Inventors: Robert Wunsche, III, Clarkston, MI (US); Mustafa Mahmoud, Northville, MI (US); Christian Munte, Livonia, MI (US); Evan Shriner, Wyandotte, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 197 days.

(21) Appl. No.: 16/677,041

(22) Filed: Nov. 7, 2019

(65) Prior Publication Data
US 2020/0151635 A1    May 14, 2020

Related U.S. Application Data

(60) Provisional application No. 62/812,095, filed on Feb. 28, 2019, provisional application No. 62/760,613, filed on Nov. 13, 2018.

(51) Int. Cl.
*G06Q 10/06* (2012.01)
*G01C 21/36* (2006.01)
(Continued)

(52) U.S. Cl.
CPC ......... *G06Q 50/30* (2013.01); *G01C 21/3694* (2013.01); *G06F 21/31* (2013.01);
(Continued)

(58) Field of Classification Search
CPC ............ G06Q 50/30; G06Q 10/06313; G06Q 30/0645; G01C 21/3694; G06F 21/31; B62K 3/00; B62K 2202/00
See application file for complete search history.

(56) References Cited

U.S. PATENT DOCUMENTS

2016/0031514 A1\* 2/2016 Gerhardt ................. B62K 3/02
710/304
2016/0320195 A1 11/2016 Liu et al.
(Continued)

FOREIGN PATENT DOCUMENTS

EP     3046058 A1    7/2016

OTHER PUBLICATIONS

Gebhard, L., Golab, L., Keshav, S., & de Meer, H. (Jun. 2016). Range prediction for electric bicycles. In Proceedings of the seventh international conference on future energy systems (pp. 1-11). (Year: 2016).\*

(Continued)

*Primary Examiner* — Rutao Wu
*Assistant Examiner* — Letoria G Knight
(74) *Attorney, Agent, or Firm* — Harness, Dickey & Pierce, P.L.C.

(57) ABSTRACT

A method and system are disclosed and include determining, in response to receiving an integrated transportation request, a route based on (i) at least one of a location of a vehicle and a user, and (ii) a destination associated with the integrated transportation request. The method also includes determining a vehicle portion and a secondary transportation apparatus portion of the route based on at least one of (i) the location, (ii) the destination, (iii) an integrated transportation history associated with the user, (iv) traffic information retrieved from a mapping application, and (v) operating information of a secondary transportation apparatus. The (Continued)

method also includes displaying the vehicle portion while the vehicle is operating. The method also includes transmitting the secondary transportation apparatus portion to at least one of a portable device associated with the user and the secondary transportation apparatus.

18 Claims, 9 Drawing Sheets

(51) Int. Cl.
    *G06F 21/31*     (2013.01)
    *B62K 3/00*     (2006.01)
    *G06Q 50/30*     (2012.01)

(52) U.S. Cl.
    CPC .......... *G06Q 10/06313* (2013.01); *B62K 3/00* (2013.01); *B62K 2202/00* (2013.01)

(56) References Cited

U.S. PATENT DOCUMENTS

| | | | |
|---|---|---|---|
| 2017/0176195 A1* | 6/2017 | Rajagopalan | B60L 58/12 |
| 2017/0213273 A1* | 7/2017 | Dietrich | G01C 21/3461 |
| 2018/0012092 A1* | 1/2018 | Gleeson-May | G06K 9/00979 |
| 2018/0082585 A1* | 3/2018 | Zhang | G08G 1/096822 |
| 2018/0370386 A1* | 12/2018 | Lery | B61D 45/001 |
| 2019/0056233 A1* | 2/2019 | Liu | G01C 21/3423 |
| 2019/0219411 A1* | 7/2019 | Christen | G01C 21/3476 |
| 2020/0111268 A1* | 4/2020 | Montague | G01C 21/3697 |

OTHER PUBLICATIONS

International Search Report regarding International Application No. PCT/US2019/061188, dated Mar. 9, 2020.
Written Opinion regarding International Application No. PCT/US2019/061188, dated Mar. 9, 2020.

* cited by examiner

INTEGRATED TRANSPORTATION SERVICES FOR VEHICLE-SHARING FLEET

CROSS-REFERENCE TO RELATED APPLICATIONS

This application claims the benefit of U.S. Provisional Application No. 62/760,613, filed on Nov. 13, 2018 and U.S. Provisional Application No. 62/812,095 filed on Feb. 28, 2019. The entire disclosures of each of the above applications are incorporated herein by reference.

FIELD

The present disclosure relates to methods and systems for providing integrated transportation services for a vehicle-sharing fleet.

BACKGROUND

This section provides background information related to the present disclosure and is not necessarily prior art.

Vehicle-sharing fleet managers may have a variety of vehicles that are available to rent for a predefined period of time, such as an hour, using a vehicle-sharing application. Likewise, bicycle-sharing and scooter-sharing fleet managers may have a variety of bicycles and scooters, respectively, which are available to rent for a predefined period of time. However, these vehicle-sharing, bicycle-sharing, and scooter-sharing services lack sufficient and effective integrated transportation services that enable users to rent, for example, a vehicle and a scooter in order to arrive at a destination.

SUMMARY

This section provides a general summary of the disclosure, and this section is not a comprehensive disclosure of its full scope or all of its features.

A method is disclosed and includes determining, using a processor configured to execute instructions stored in a nontransitory computer-readable medium and in response to receiving an integrated transportation request, a route based on (i) at least one of a location of a vehicle and a user, and (ii) a destination associated with the integrated transportation request. The method also includes determining, using the processor, a vehicle portion and a secondary transportation apparatus portion of the route based on at least one of (i) the location, (ii) the destination, (iii) an integrated transportation history associated with the user, (iv) traffic information retrieved from a mapping application, and (v) operating information of a secondary transportation apparatus. The method also includes displaying, using a display in communication with the processor, the vehicle portion while the vehicle is operating. The method also includes transmitting, using the processor, the secondary transportation apparatus portion to at least one of a portable device associated with the user and the secondary transportation apparatus.

In some embodiments, the integrated transportation history associated with the user of the vehicle includes information representing at least one of (i) a frequency of integrated transportation requests and (ii) distance information associated with secondary transportation apparatus portions of previous integrated transportation sessions.

In some embodiments, the distance information is defined by the user.

In some embodiments, the traffic information represents at least one of a vehicle traffic density associated with the location and the destination.

In some embodiments, the operating information indicates at least one of a depletion time of a battery of the secondary transportation apparatus and a battery level of the battery.

In some embodiments, the depletion time is based on an amount of time that a vehicle battery will provide power to the secondary transportation apparatus during the vehicle portion; and the battery level is based on the amount of time that the vehicle battery will provide power to the secondary transportation apparatus during the vehicle portion.

In some embodiments, the secondary transportation apparatus is one of a scooter and a bicycle.

In some embodiments, the method further comprises providing, using a vehicle battery, power to a battery of the secondary transportation apparatus while the user is operating the vehicle.

In some embodiments, the method further comprises transmitting, using the processor and in response to completing the vehicle portion, the secondary transportation apparatus portion to at least one of the portable device and the secondary transportation apparatus.

In some embodiments, the method further comprises receiving the integrated transportation request via one of the display and the portable device.

A system is also disclosed and includes a processor configured to execute instructions stored in a nontransitory computer-readable medium. The instructions include, in response to receiving an integrated transportation request, determining a route based on (i) at least one of a location of a vehicle and a user, and (ii) a destination associated with the integrated transportation request. The instructions also include determining a vehicle portion and a secondary transportation apparatus portion of the route based on at least one of (i) the location, (ii) the destination, (iii) an integrated transportation history associated with the user, (iv) traffic information retrieved from a mapping application, and (v) operating information of a secondary transportation apparatus. The instructions also include instructing a display in communication with the processor to display the vehicle portion while the vehicle is operating. The instructions also include transmitting the secondary transportation apparatus portion to at least one of a portable device associated with the user and the secondary transportation apparatus.

In some embodiments, the integrated transportation history associated with the user of the vehicle includes information representing at least one of (i) a frequency of integrated transportation requests and (ii) distance information associated with secondary transportation apparatus portions of previous integrated transportation sessions.

In some embodiments, the distance information is defined by the user.

In some embodiments, the traffic information represents at least one of a vehicle traffic density associated with the location and the destination.

In some embodiments, the operating information indicates at least one of a depletion time of a battery of the secondary transportation apparatus and a battery level of the battery.

In some embodiments, the depletion time is based on an amount of time that a vehicle battery will provide power to the secondary transportation apparatus during the vehicle portion; and the battery level is based on the amount of time that the vehicle battery will provide power to the secondary transportation apparatus during the vehicle portion.

In some embodiments, the secondary transportation apparatus is one of a scooter and a bicycle.

In some embodiments, the system further comprises a vehicle battery configured to provide power to a battery of the secondary transportation apparatus while the user is operating the vehicle.

In some embodiments, the instructions further comprise, in response to completing the vehicle portion, transmitting the secondary transportation apparatus portion to at least one of the portable device and the secondary transportation apparatus.

In some embodiments, the instructions further comprise receiving the integrated transportation request via one of the display and the portable device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

With reference to FIGS. 1-4, example illustrations of a system 1 are shown. The system 1 may include a vehicle 5, a portable device 10, an ignition switch 30, an interior camera 40, and a storage compartment 45. In one embodiment, the vehicle 5 is part of a vehicle-sharing fleet. Additionally or alternatively, the vehicle 5 may be part of a ride-sharing fleet and/or a ride-hailing fleet.

The vehicle 5 may include an electronic control module (ECM) 50. As an example, the ECM 50 may be located behind a dashboard 48 of the vehicle 5. While one interior camera 40 is shown in this example, any number of interior cameras 40 can be included within the vehicle 5. Moreover, while the interior camera 40 is located on a rear-view mirror in FIG. 1, the interior camera 40 may be positioned at any suitable location within the interior of the vehicle 5.

The portable device 10 may be any device that is configured to transmit and receive wireless signals, such as a smartphone, smartwatch, wearable electronic device, key fob, tablet device, laptop device, a Bluetooth-enabled device, or other device associated with a user 20 and capable of wireless communication. As described below in further detail, the portable device 10 is configured to generate vehicle-sharing requests and define personalized vehicle settings via an application executing on the portable device 10. Furthermore, the portable device 10 is configured to receive a digital key associated with the vehicle 5 from a fleet manager computing system (shown below) in response to transmitting the vehicle-sharing request. The digital key enables the user 20 to unlock and enter the vehicle 5. Accordingly, the portable device 10 may include at least one processor that is configured to execute instructions stored in a nontransitory computer-readable medium, such as a random-access memory (RAM) and/or a read-only memory (ROM).

The interior camera 40 may be configured to obtain image data of the user 20. Based on the image data obtained by the interior camera 40 and a vehicle-sharing account associated with the user 20, the ECM 50 may be configured to authenticate the user 20. In order to carry out the functionality of algorithms described herein, the ECM 50 may include at least one processor that is configured to execute instructions stored in a nontransitory computer-readable medium, such as a random-access memory (RAM) and/or a read-only memory (ROM). The ECM 50 may be in communication with the interior camera 40 via a hardware link, such as a local interconnect network (LIN) cable, a controller area network (CAN) cable, an Ethernet cable, or any other suitable hardwire link. In other embodiments, the ECM 50 may be in communication with the interior camera 40 via any suitable telemetric link, such as a Bluetooth link (e.g., Bluetooth low-energy), a Wi-Fi or Wi-Fi direct link, a cellular link, etc. Likewise, the ECM 50 may be in communication with the portable device 10 via any suitable telemetric link, such as a Bluetooth link (e.g., Bluetooth low-energy), a Wi-Fi or Wi-Fi direct link, a cellular/LTE link, etc.

In response to the ECM 50 authenticating the user 20, the ECM 50 may enable the user 20 to activate the vehicle 5. As an example, the ECM 50 may enable the user 20 to retrieve keys stored in the storage compartment 45 (e.g., glove box) of the vehicle 5 for subsequent placement and rotation of the ignition switch 30. Alternatively, the ignition switch 30 may be implemented by a button, and as such, the vehicle 5 may be activated in response to pressing the button and the portable device 10 being located within an activation range of the vehicle 5. Additionally, in response to the ECM 50 authenticating the user 20, the ECM 50 may adjust various vehicle settings according to the vehicle-sharing account associated with the user 20.

Figure 2:
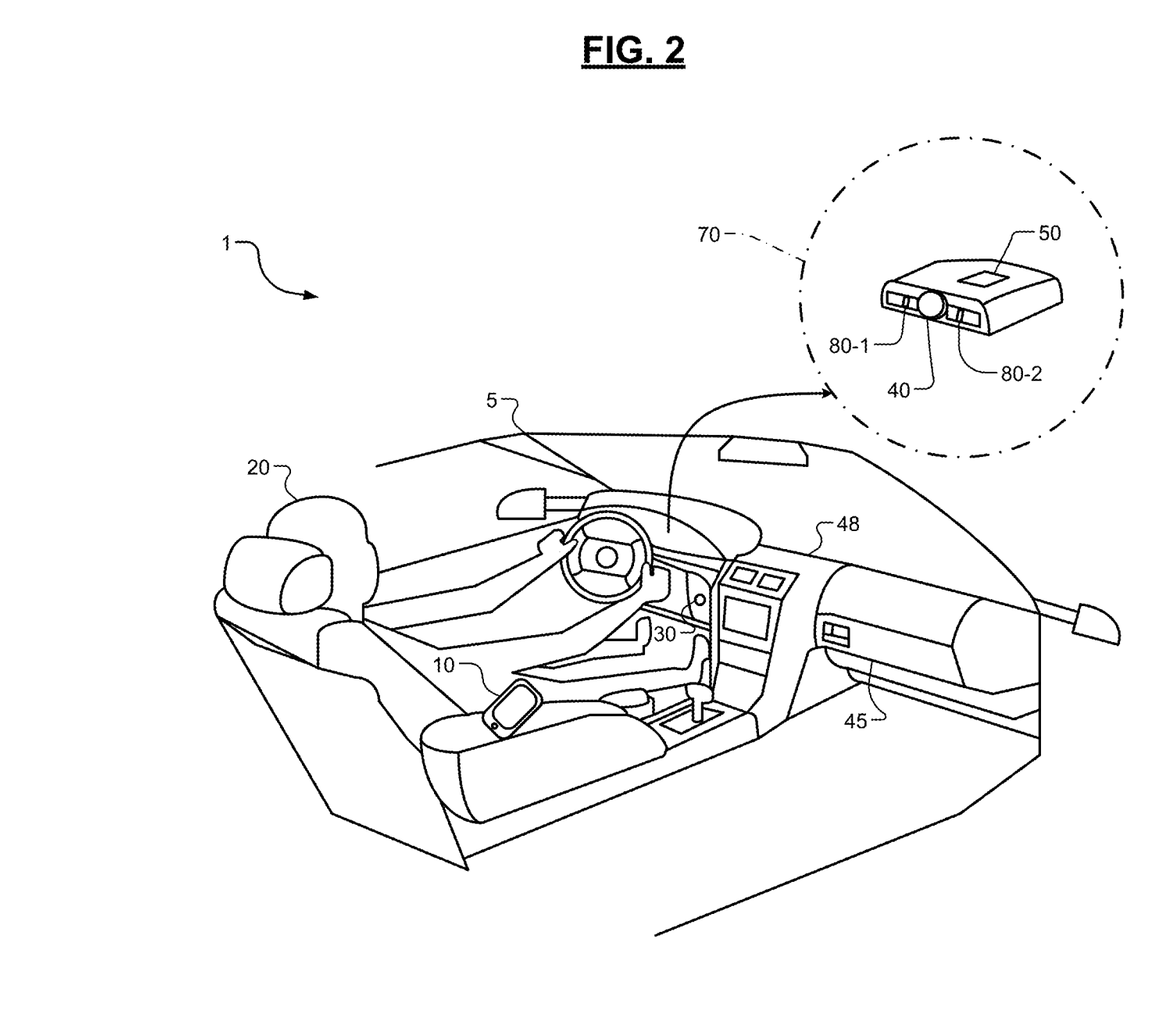

In other embodiments and as shown in FIG. 2, the dashboard may also include a driver status monitor (DSM) 70, which may be mounted over a steering column connected to the steering wheel of the vehicle 5. The DSM 70 may include infrared (IR) sensors 80-1, 80-2 (collectively referred to as IR sensors 80), the interior camera 40, and the ECM 50. The DSM 70 may be configured to obtain facial feature data of the user 20. As an example, the ECM 50 may obtain facial feature data sensed by the IR sensors 80 and the interior camera 40, including images of the face and head of the user 20. Based on the facial feature data, the ECM 50 is configured to, for example, perform a variety of image processing and/or computer vision techniques for facial recognition, as understood by one of ordinary skill in the art.

Figure 1:
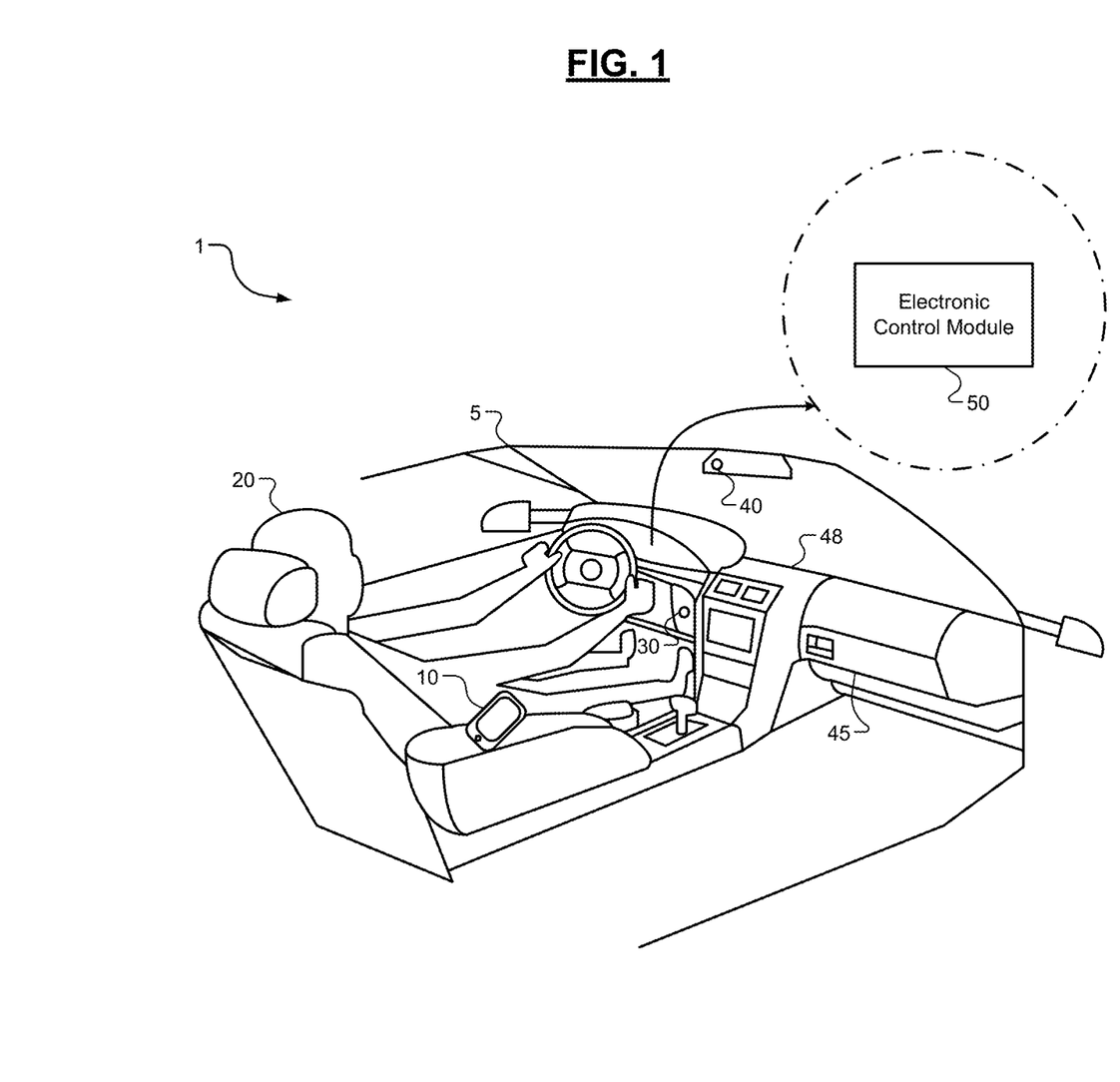
FIGS. 1-5 are example diagrams of a vehicle according to the present disclosure.

While the embodiments shown in FIGS. 1-2 include one interior camera 40, in other embodiments, any number of interior cameras 40 may be included within the vehicle 5. Moreover, while the interior camera 40 is included on a rear-view mirror in FIG. 1 and the DSM 70 in FIG. 2, the interior camera 40 may be positioned at any suitable location of the interior of the vehicle 5.

Figure 3:
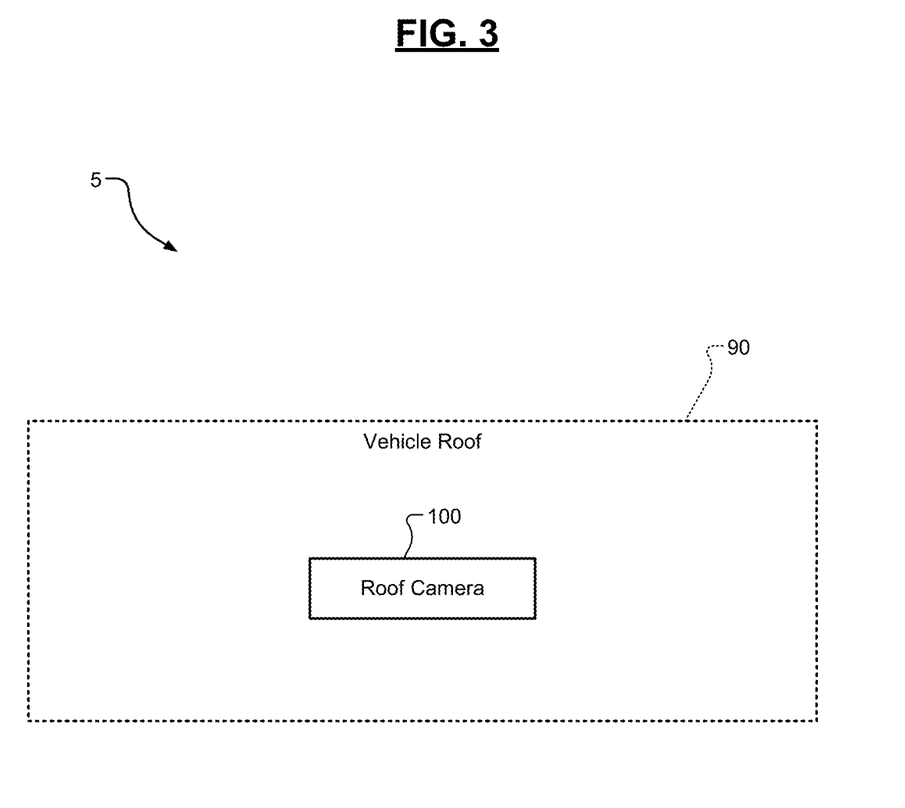

Additionally, a vehicle roof 90 (e.g., a headliner) of the vehicle 5 may include a roof camera 100, as shown in FIG. 3. While this embodiment illustrates one roof camera 100, in other embodiments, any number of roof cameras 100 may be included on the vehicle roof 90. The roof camera 100 is configured to obtain image data representing the interior of the vehicle 5. The ECM 50 may be in communication with the roof camera 100 via a hardware link, such as a LIN cable, an Ethernet cable, or any other suitable hardwire link. In other embodiments, the ECM 50 may be in communication with the roof camera 100 via any suitable telemetric link, such as a Bluetooth link (e.g., Bluetooth low-energy), a Wi-Fi or Wi-Fi direct link, a cellular link, etc.

Figure 4:
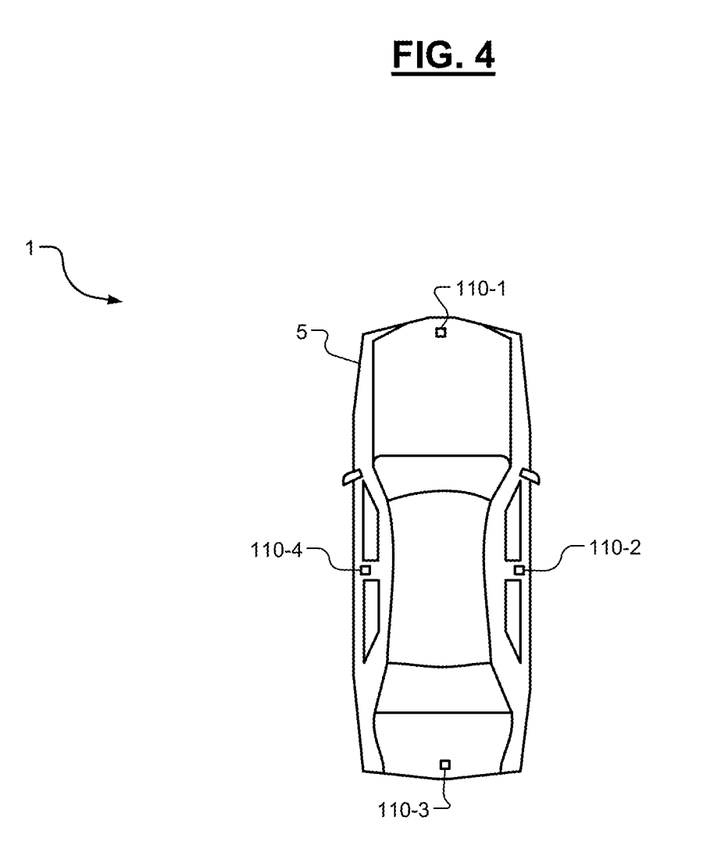

Additionally, the vehicle 5 may include a plurality of exterior cameras 110-1, 110-2, 110-3, 110-4 (collectively referred to as exterior cameras 110), as shown in FIG. 4. While this embodiment illustrates four exterior cameras 110, in other embodiments, the vehicle 5 may include any number of exterior cameras 110, and the exterior cameras 110 may be located at any suitable location on an exterior of the vehicle 5. The exterior cameras 110 may be configured to obtain image data representing the exterior of the vehicle 5. The ECM 50 may be in communication with the exterior cameras 110 via a hardware link, such as a LIN cable, a CAN cable, an Ethernet cable, or any other suitable hardwire link. In other embodiments, the ECM 50 may be in communication with the exterior cameras 110 via any suitable telemetric link, such as a Bluetooth link (e.g., Bluetooth low-energy), a Wi-Fi or Wi-Fi direct link, a cellular link, etc.

Figure 5:
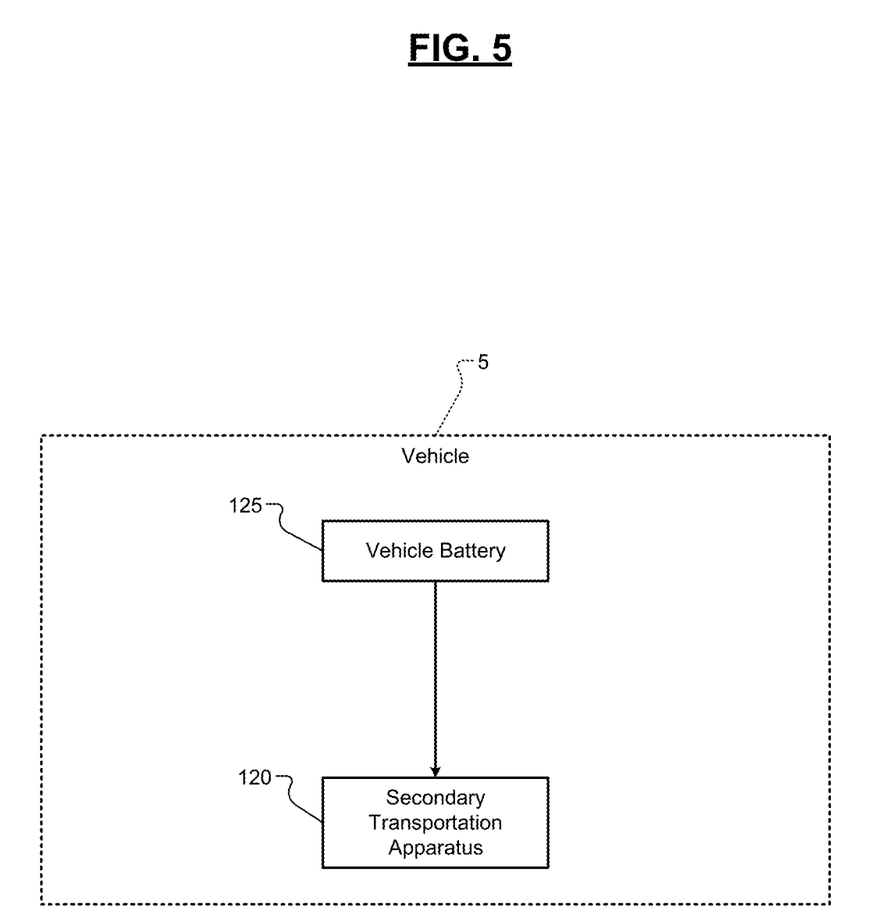

In some embodiments, the vehicle 5 may include a secondary transportation apparatus 120, as shown in FIG. 5. The user 20 may use the secondary transportation apparatus 120 in order to execute, for example, a secondary sharing service (e.g., a scooter-sharing service, a bicycle-sharing service, etc.). The secondary sharing service may be performed as part of an integrated transportation service (i.e., the user 20 uses the vehicle-sharing service and the scooter-sharing service to arrive at a destination). As an example, the user 20 may use the vehicle-sharing service and the secondary sharing service to arrive at a stadium that is hosting a sporting event. More specifically, the user 20 may use the vehicle-sharing service (i.e., the vehicle 5) to arrive at a designated parking lot associated with the stadium, and once the user 20 arrives at the designated parking lot, the user 20 may use the secondary sharing service (i.e., the secondary transportation apparatus 120) to travel from the designated parking lot to the stadium. The vehicle sharing service and the secondary sharing service are described below in further detail with reference to FIGS. 6A-6C and FIG. 7.

The secondary transportation apparatus 120 may be implemented by any transportation apparatus of a sharing fleet, such as a scooter of a scooter-sharing fleet (e.g., a BIRD® scooter), a bicycle of a bicycle-sharing fleet (e.g. a MoGo® bicycle), and other similar transportation apparatuses. Furthermore, the secondary transportation apparatus 120 may be configured to receive power from a vehicle battery 125 during a vehicle portion of an integrated transportation session, which is described below in further detail with reference to FIGS. 6A-6C and FIG. 7. The vehicle 5 may also be configured to provide power to the secondary transportation apparatus 120 while the user 20 is operating the vehicle 5 during a vehicle portion of an integrated transportation session, which is described below in further detail.

Figure 6A:
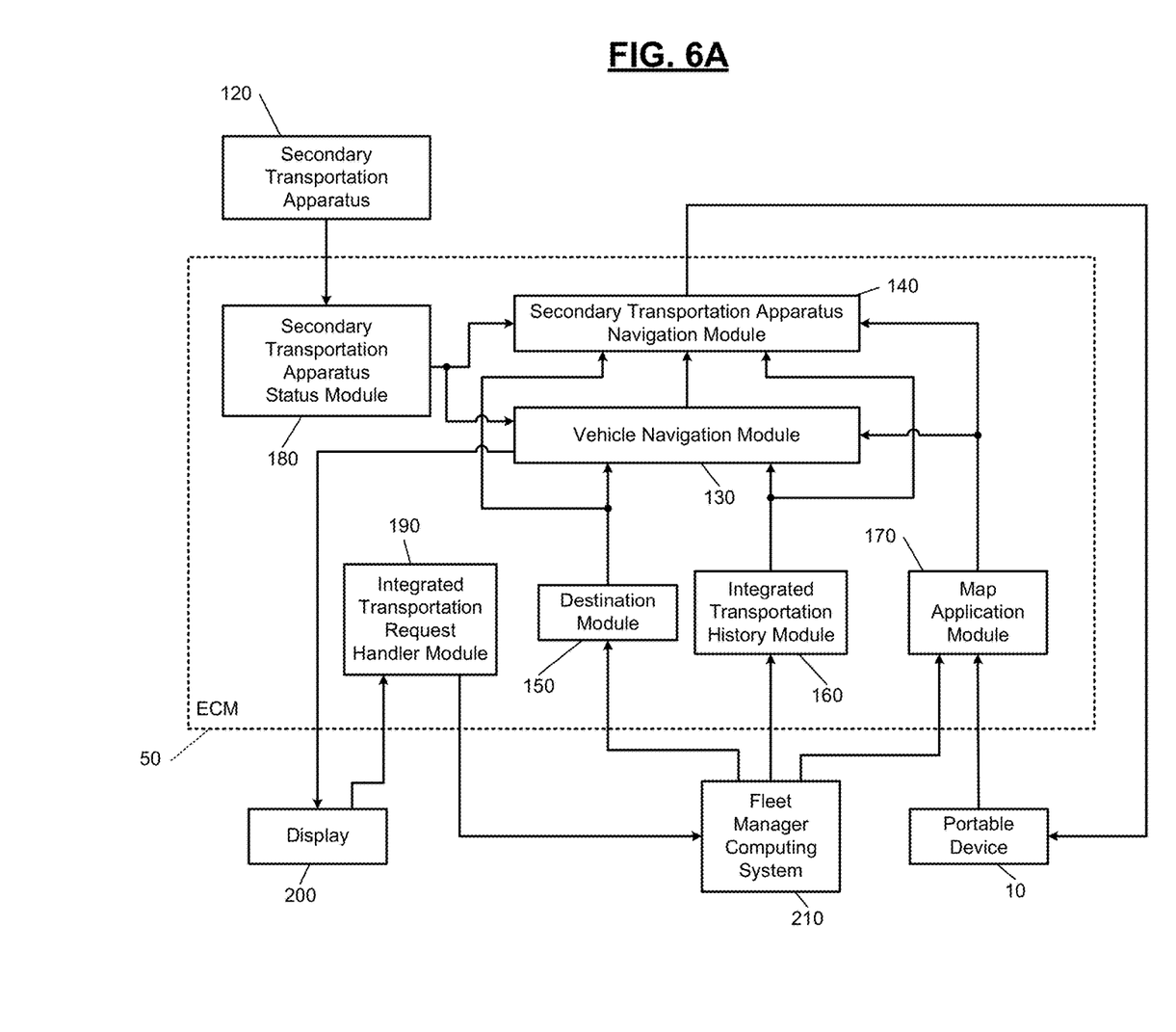
FIGS. 6A-6C illustrate a detailed example functional block diagram of an electronic control module of the vehicle according to the present disclosure.
Figure 6B:
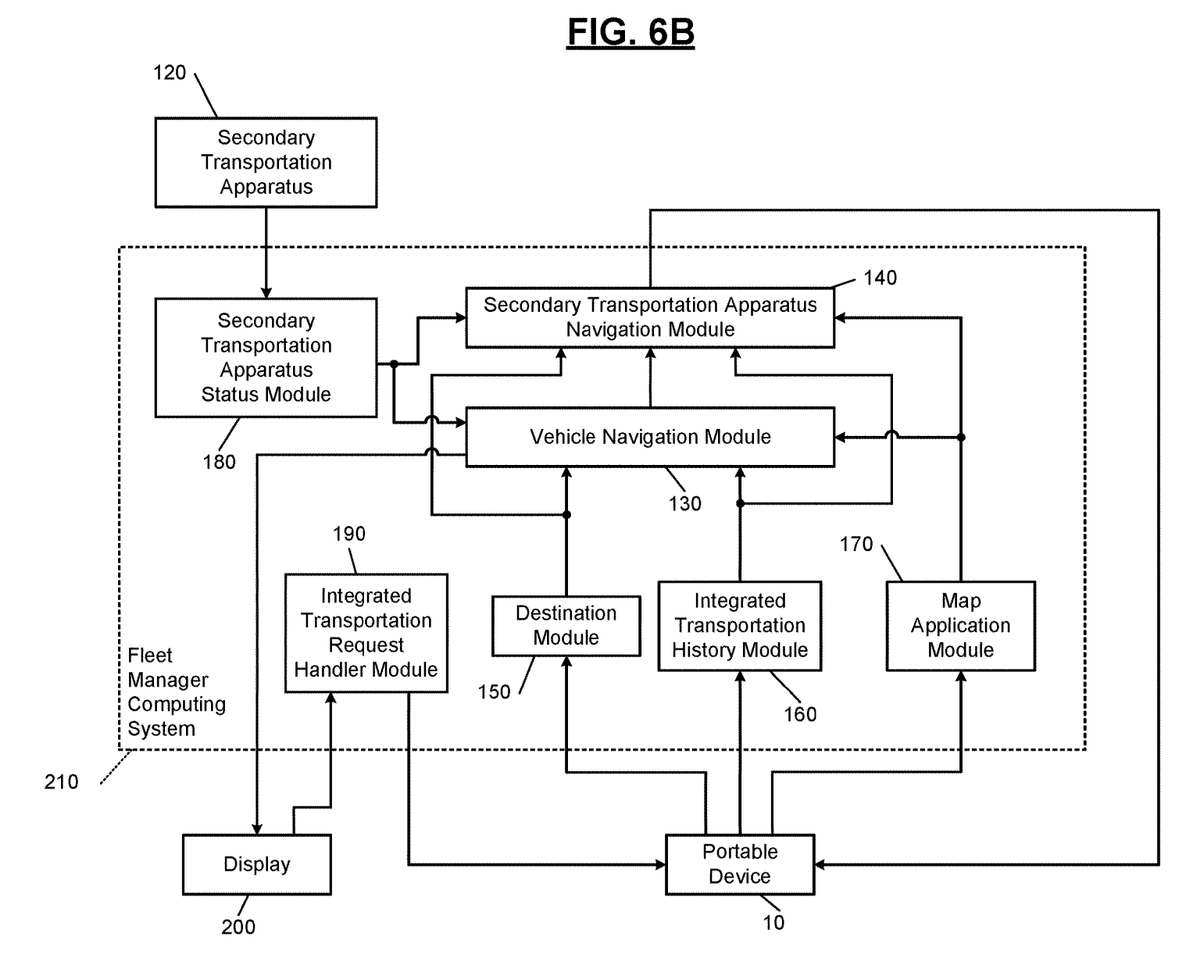

With reference to FIG. 6A, a detailed illustration of the ECM 50 is shown. The ECM 50 may include a vehicle navigation module (VNM) 130, a secondary transportation apparatus navigation module (STANM) 140, a destination module 150, an integrated transportation history module 160, a map application module 170, a secondary transportation apparatus status module 180, and an integrated transportation request handler module 190. The modules of the ECM 50 may be implemented by one or more processors that are configured to execute instructions stored in a non-transitory computer-readable medium, such as a RAM and/or ROM. In other embodiments, the VNM 130, the STANM 140, the destination module 150, the integrated transportation history module 160, the map application module 170, the secondary transportation apparatus status module 180, and the integrated transportation request handler module 190 may be included as part of a fleet manager computing system 210, as shown in FIG. 6B. In order to carry out the functionality described herein, the fleet manager computing system 210 may include one or more processors that are configured to execute instructions stored in a nontransitory computer-readable medium, such as a RAM and/or ROM.

In one embodiment, when the user 20 enters the vehicle 5 in order to begin a vehicle-sharing session, a display 200 of the dashboard 48 may prompt the user 20 to indicate whether the user 20 desires to use the secondary transportation apparatus 120 in addition to the vehicle-sharing service in order to arrive at the destination associated with the vehicle-sharing request. As an example and as shown by screenshot 2 in FIG. 6C, the display 200 may display a first graphical user interface (GUI) element 201 that, in response to being selected by the user 20, causes the integrated transportation request handler module 190 to transmit a signal corresponding to the integrated transportation service selection to fleet manager computing system 210. Additionally or alternatively, the display 200 may display a second GUI element 202 that, in response to being selected by the user 20, causes the integrated transportation request handler module 190 to transmit a signal corresponding to the user 20 desiring to only use the vehicle-sharing service in order to arrive at the destination. In other embodiments, a display of the portable device 10 may be configured to display the first and second GUI elements 201, 202.

Figure 6C:
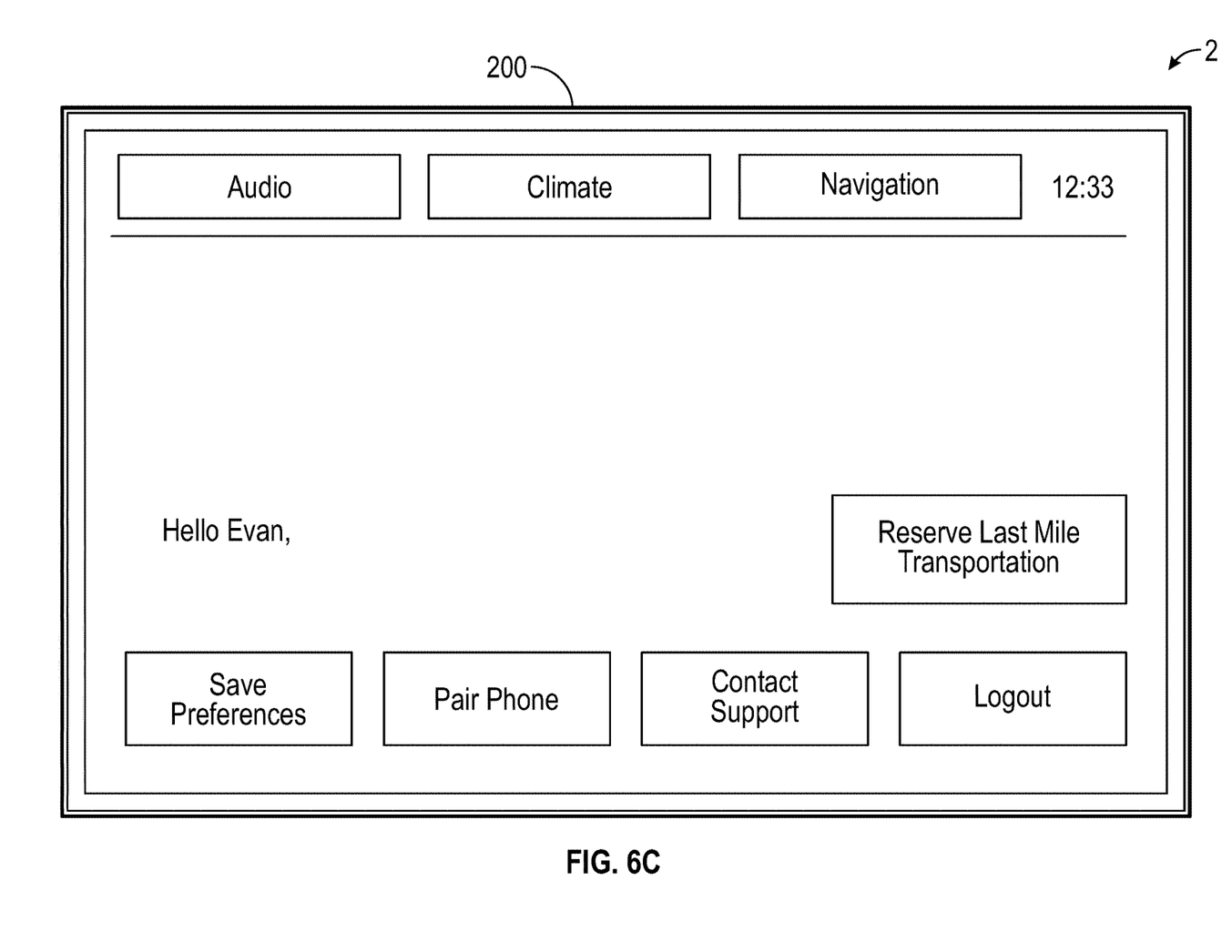

The GUI elements may also be configured to indicate the type of secondary transportation apparatus 120 is located within the vehicle 5. As an example, the GUI elements may include graphical and/or textual descriptions indicating that the secondary transportation apparatus 120 is, for example, a scooter of a scooter-sharing service or a bicycle of a bicycle-sharing fleet.

Based on the selection of one of the GUI elements, the VNM 130 and/or the STANM 140 is configured to generate navigation instructions that are displayed on the display 200 and/or portable device 10. As an example, if the user 20 selects the first GUI element 201 (i.e., the user 20 desires the integrated transportation service), the VNM 130 is configured to generate vehicle navigation instructions that are associated with the vehicle 5 and displayed on the display 200. Furthermore, in response to the user 20 selecting the first GUI element 201, the STANM 140 is configured to generate secondary transportation apparatus navigation instructions that are associated with the secondary transportation apparatus 120 and displayed on the portable device 10. In other embodiments, if the user 20 selects the second GUI element 202 (i.e., the user 20 desires to only use the vehicle-sharing service), the VNM 130 is configured to only generate the vehicle navigation instructions.

The VNM 130 and the STANM 140 are configured to generate the vehicle navigation instructions and the secondary transportation apparatus navigation instructions, respectively, based on destination information obtained by the destination module 150; integrated transportation history information obtained by the integrated transportation history module 160; map application information obtained by the map application module 170; and/or secondary transportation apparatus information obtained by the secondary transportation apparatus status module 180.

The destination module 150 is configured to obtain destination information associated with the vehicle-sharing request generated by the user 20 from the fleet manager computing system 210. The destination information may include a location corresponding to the destination (e.g., GPS coordinates) and a destination type (e.g., a stadium, restaurant, university, etc.). Based on the obtained destination information, the VNM 130 and/or the STANM 140 may generate the vehicle navigation instructions and the secondary transportation apparatus navigation instructions, respectively.

The integrated transportation history module 160 is configured to obtain integrated transportation history information associated with a vehicle-sharing account corresponding to the user 20 from the fleet manager computing system 210. As an example, the integrated transportation history information may indicate a frequency of integrated transportation service requests generated by the user 20 (e.g., the user 20 requests integrated transportation services during 80% of vehicle-sharing sessions). As another example, the integrated transportation history information may indicate distance information associated with prior integrated transportation services (e.g., the median distance the user 20 has traveled using the secondary transportation apparatus 120 is 0.5 miles; the maximum distance the user 20 has traveled using the secondary transportation apparatus 120 is 1.5 miles; and the minimum distance the user 20 has traveled using the secondary transportation apparatus 120 is 0.25 miles). Moreover, the distance information may be further defined by the type of secondary transportation apparatus 120 used during prior integrated transportation services. As another example, the integrated transportation history information may indicate custom integrated transportation settings defined by the user 20 and as indicated by the corresponding vehicle-sharing account (e.g., the vehicle-sharing account associated with the user 20 indicates that (i) she never wants to use the secondary transportation apparatus 120 for more than a predefined distance and/or time, (ii) she never wants to use the secondary transportation apparatus 120 in certain locations, (iii) if a scooter and bicycle are located in the vehicle 5, the user 20 prefers the scooter, etc.). Based on the integrated transportation history information, the VNM 130 and the STANM 140 generate the vehicle navigation instructions and the secondary transportation apparatus navigation instructions, respectively.

The map application module 170 is configured to obtain (i) destination information associated with the vehicle-sharing request generated by the user 20 from the fleet manager computing system 210 and (ii) location information of the user 20 and/or the vehicle 5 from the portable device 10 or the fleet manager computing system 210. Furthermore, the map application module 170 is configured to obtain traffic information from a mapping application being executed by the fleet manager computing system 210 or the portable device 10. The traffic information may be representative of traffic conditions corresponding to each road in a road system or a set of roads in the road system. Based on the destination information, the location information, and the traffic information, the VNM 130 and/or the STANM 140 may generate the vehicle navigation instructions and the secondary transportation apparatus navigation instructions, respectively.

The secondary transportation apparatus status module 180 is configured obtain operating information associated with the secondary transportation apparatus 120. As an example, the operating information may include a battery level of the secondary transportation apparatus 120, a depletion time of the battery of the secondary transportation apparatus 120, and actual or potential defects associated with the secondary transportation apparatus 120 (e.g., braking functions may be impaired due to worn out brake pads). The battery level may be based on an actual battery level and/or a predicted battery level that is based on, for example, an amount of time that the vehicle battery 125 will charge the battery of the secondary transportation apparatus 120 during the vehicle portion of the integrated transportation session. Likewise, the depletion time may be based on an actual depletion time and/or a predicted depletion time that is based on an amount of time that the vehicle battery 125 will charge the battery of the secondary transportation apparatus 120 during the vehicle portion of the integrated transportation session. Based on the operating information, the VNM 130 and the STANM 140 generate the vehicle navigation instructions and the secondary transportation apparatus navigation instructions, respectively.

Additionally, the STANM 140 is configured to generate the secondary transportation apparatus navigation instructions based on the vehicle navigation instructions generated by the VNM 130. As an example, if the VNM 130 generates vehicle instructions that instruct the user 20 to travel from the originating location to an intermediate location, which is located between the originating location and the destination indicated by the vehicle-sharing request, the secondary transportation apparatus navigation instructions may include navigation instructions that enable the user to travel from the intermediate location to the destination using the secondary transportation apparatus 120.

In one example integrated transportation session, the user 20 may use the vehicle 5 and the secondary transportation apparatus 120, which may be implemented by a scooter, to travel from a location of the user 20 (e.g., a user's home), to a destination indicated by the vehicle-sharing request, (e.g., a stadium that is hosting a sporting event). Furthermore, the user-defined integrated transportation history information indicates that the user 20 is not willing to use the secondary transportation apparatus 120 near busy roadways and for more than 1.5 miles, and the operating information indicates that the secondary transportation apparatus 120 has a battery level that would enable the user 20 to use the secondary transportation apparatus 120 for 1.25 miles. In addition, the traffic information indicates that an interstate highway and a first roadway generally used in ideal conditions for arriving to the stadium is currently experiencing a traffic slowdown due to, for example, increased traffic caused by the sporting event.

Based on the above information, the VNM 130 may generate vehicle navigation instructions that instruct the user 20 to travel from the user's home to a parking lot, which is located 0.75 miles away from the stadium, using a state highway and a second roadway. Additionally, based on the above information and the vehicle navigation instructions, the STANM 140 may generate the secondary apparatus transportation navigation instructions that instruct the user to travel, using the scooter, from the parking lot to the stadium. The vehicle navigation instructions may be displayed on the display 200 and/or the portable device 10 while the user 20 is operating the vehicle 5 during the vehicle portion of the integrated transportation session. The secondary apparatus transportation navigation instructions may be displayed on a display device of the secondary transportation apparatus 120 and/or the portable device 10 while the user 20 is operating the secondary transportation apparatus 120 during the secondary transportation apparatus portion of the integrated transportation session.

Figure 7:
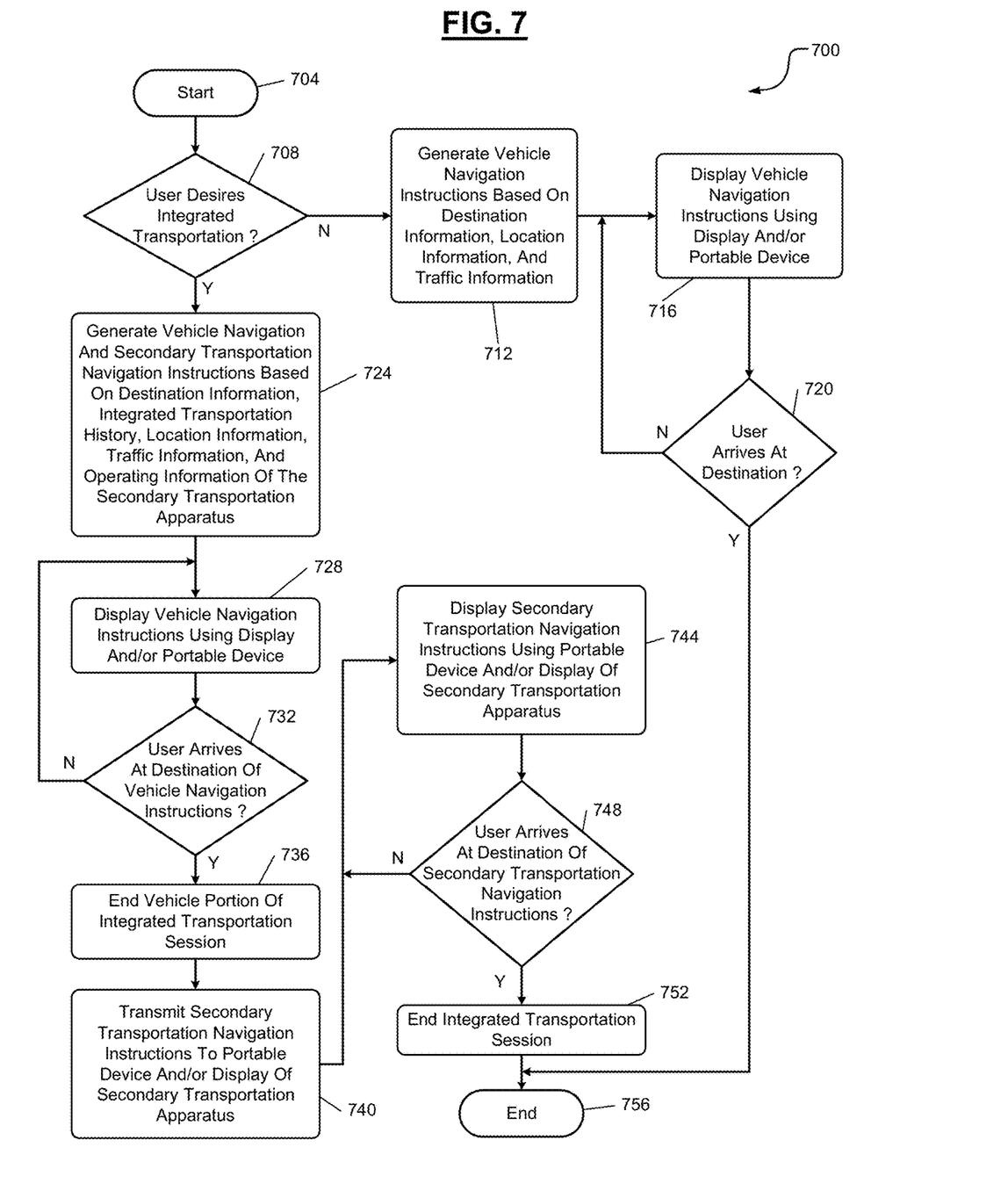
FIG. 7 illustrates an example control algorithm according to the present disclosure.

With reference to FIG. 7, a flowchart illustrating a control algorithm 700 for generating and displaying the vehicle navigation instructions and the secondary transportation apparatus navigation instructions is shown. The control algorithm 700 begins at 704 when the user 20 is inside of the vehicle 5 and the ECM 50 has authenticated the user 20. At 708, the control algorithm 700 determines, using the ECM 50 and based on a selection of one of the GUI elements on the display 200, whether the user 20 desires an integrated transportation service. If so, the control algorithm 700 proceeds to 724; otherwise, the control algorithm 700 proceeds to 712. At 712, the control algorithm 700 determines, using the ECM 50, the vehicle navigation instructions based on the destination information, the location information, and the traffic information. At 716, the control algorithm 700 displays, using the display 200 and/or the portable device 10, the vehicle navigation instructions. At 720, the control algorithm 700 determines, using the ECM 50, whether the user 20 has arrived at the destination associated with the vehicle-sharing request. If so, the control algorithm 700 proceeds to 756; otherwise, the control algorithm 700 proceeds to 716.

At 724, the control algorithm 700 generates, using the ECM 50, the vehicle navigation instructions and the secondary transportation apparatus navigation instructions based on the destination information, the integrated transportation history information, the location information, the traffic information, and the operating information of the secondary transportation apparatus 120. At 728, the control algorithm 700 displays, using the display 200 and/or the portable device 10, the vehicle navigation instructions. At 732, the control algorithm 700 determines, using the ECM 50, whether the user 20 has arrived at the destination associated with the vehicle navigation instructions. If so, the control algorithm 700 proceeds to 736; otherwise, the control algorithm 700 proceeds to 728. At 736, the control algorithm 700 ends the vehicle portion of the integrated transportation session.

At 740, the control algorithm 700 transmits, using the ECM 50, the secondary transportation apparatus navigation instructions to the portable device 10 and/or a display of the secondary transportation apparatus 120. At 744, the control algorithm 700 displays, using the portable device 10 and/or the display of the secondary transportation apparatus 120, the secondary transportation apparatus navigation instructions. At 748, the control algorithm 700 determines, using the portable device 10, whether the user 20 has arrived at the destination associated with the secondary transportation apparatus navigation instructions. If so, the control algorithm 700 proceeds to 752; otherwise, the control algorithm 700 proceeds to 744. At 752, the control algorithm 700 ends the integrated transportation session. Additionally, the control algorithm 700 may generate a bill and/or receipt corresponding to the integrated transportation session in response to the integrated transportation session ending. At 756, the control algorithm 700 ends.

The present disclosure provides a method that includes determining, using a processor configured to execute instructions stored in a nontransitory computer-readable medium and in response to receiving an integrated transportation request, a route based on (i) at least one of a location of a vehicle and a user, and (ii) a destination associated with the integrated transportation request, determining, using the processor, a vehicle portion and a secondary transportation apparatus portion of the route based on at least one of (i) the location, (ii) the destination, (iii) an integrated transportation history associated with the user, (iv) traffic information retrieved from a mapping application, and (v) operating information of a secondary transportation apparatus, displaying, using a display in communication with the processor, the vehicle portion while the vehicle is operating, and transmitting, using the processor, the secondary transportation apparatus portion to at least one of a portable device associated with the user and the secondary transportation apparatus.

In other features, the integrated transportation history associated with the user of the vehicle includes information representing at least one of (i) a frequency of integrated transportation requests and (ii) distance information associated with secondary transportation apparatus portions of previous integrated transportation sessions.

In other features, the distance information is defined by the user.

In other features, the traffic information represents at least one of a vehicle traffic density associated with the location and the destination.

In other features, the operating information indicates at least one of a depletion time of a battery of the secondary transportation apparatus and a battery level of the battery.

In other features, the depletion time is based on an amount of time that a vehicle battery will provide power to the secondary transportation apparatus during the vehicle portion, and the battery level is based on the amount of time that the vehicle battery will provide power to the secondary transportation apparatus during the vehicle portion.

In other features, the secondary transportation apparatus is one of a scooter and a bicycle.

In other features, the method further includes using a vehicle battery, power to a battery of the secondary transportation apparatus while the user is operating the vehicle.

In other features, the method further includes transmitting, using the processor and in response to completing the vehicle portion, the secondary transportation apparatus portion to at least one of the portable device and the secondary transportation apparatus.

In other features, the method further includes receiving the integrated transportation request via one of the display and the portable device.

The present disclosure also provides a system that includes a processor configured to execute instructions stored in a nontransitory computer-readable medium. The instructions include, in response to receiving an integrated transportation request, determining a route based on (i) at least one of a location of a vehicle and a user, and (ii) a destination associated with the integrated transportation request, determining a vehicle portion and a secondary transportation apparatus portion of the route based on at least one of (i) the location, (ii) the destination, (iii) an integrated transportation history associated with the user, (iv) traffic information retrieved from a mapping application, and (v) operating information of a secondary transportation apparatus, instructing a display in communication with the processor to display the vehicle portion while the vehicle is operating, and transmitting the secondary transportation apparatus portion to at least one of a portable device associated with the user and the secondary transportation apparatus.

In other features, the integrated transportation history associated with the user of the vehicle includes information representing at least one of (i) a frequency of integrated transportation requests and (ii) distance information associated with secondary transportation apparatus portions of previous integrated transportation sessions.

In other features, the distance information is defined by the user.

In other features, the traffic information represents at least one of a vehicle traffic density associated with the location and the destination.

In other features, the operating information indicates at least one of a depletion time of a battery of the secondary transportation apparatus and a battery level of the battery.

In other features, the depletion time is based on an amount of time that a vehicle battery will provide power to the secondary transportation apparatus during the vehicle portion, and the battery level is based on the amount of time that the vehicle battery will provide power to the secondary transportation apparatus during the vehicle portion.

In other features, the secondary transportation apparatus is one of a scooter and a bicycle.

In other features, the system further includes a vehicle battery configured to provide power to a battery of the secondary transportation apparatus while the user is operating the vehicle.

In other features, the instructions further include, in response to completing the vehicle portion, transmitting the secondary transportation apparatus portion to at least one of the portable device and the secondary transportation apparatus.

In other features, the instructions further include receiving the integrated transportation request via one of the display and the portable device.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
charging, by a vehicle, a battery of a secondary transportation apparatus, during a vehicle portion of a route, the vehicle including an onboard electronic control module;
authenticating, by a processor of the electronic control module, a user, based on image data obtained by an interior camera;
determining, using the processor of the electronic control module configured to execute instructions stored in a nontransitory computer-readable medium and in response to receiving an integrated transportation request, a route based on (i) at least one of a location of the vehicle and the user, and (ii) a destination associated with the integrated transportation request;
displaying, using a display of the vehicle in communication with the processor,
a graphical user interface element prompting the user to indicate whether to use a secondary transportation apparatus;
receiving, using the processor, input from the user indicating whether to use the secondary transportation apparatus;
in response to the input from the user indicating to use the secondary transportation apparatus:
determining, using the processor of the electronic control module, the vehicle portion of the route and a secondary transportation apparatus portion of the route based on a depletion time of a battery of the secondary transportation apparatus or a battery level of the battery, the depletion time and battery level being determined based on the charging of the battery during the vehicle portion of the route, and at least one of (i) the location, (ii) the destination, (iii) an integrated transportation history associated with the user, and (iv) traffic information retrieved from a mapping application;
displaying, using the display of the vehicle in communication with the processor, navigation instructions for the vehicle portion while the vehicle is operating during the vehicle portion;
transmitting, using the processor of the electronic control module, navigation instructions for the secondary transportation apparatus portion of the route to a portable device associated with the user; and
displaying, using a display of the portable device, the navigation instructions for the secondary transportation apparatus portion while the secondary transportation apparatus is operating during the secondary transportation apparatus portion;
wherein the vehicle is an automobile and the secondary transportation apparatus is an electric vehicle that is stored inside of the automobile during the vehicle portion of the route.

2. The method of claim 1, wherein the integrated transportation history associated with the user of the vehicle includes information representing at least one of (i) a frequency of integrated transportation requests and (ii) distance information associated with secondary transportation apparatus portions of previous integrated transportation sessions.

3. The method of claim 2, wherein the distance information is defined by the user.

4. The method of claim 1, wherein the traffic information represents at least one of a vehicle traffic density associated with the location and the destination.

5. The method of claim 1, wherein: the depletion time is based on an amount of time that a vehicle battery will provide power to the secondary transportation apparatus during the vehicle portion; and the battery level is based on the amount of time that the vehicle battery will provide power to the secondary transportation apparatus during the vehicle portion.

6. The method of claim 1, wherein the secondary transportation apparatus is one of a scooter and a bicycle.

7. The method of claim 1, further comprising providing, using a vehicle battery, power to a battery of the secondary transportation apparatus while the user is operating the vehicle.

8. The method of claim 1, further comprising transmitting, using the processor and in response to completing the vehicle portion, the secondary transportation apparatus portion to at least one of the portable device and the secondary transportation apparatus.

9. The method of claim 1, further comprising receiving the integrated transportation request via one of the display of the vehicle and the portable device.

10. A system comprising:
a processor configured to execute instructions stored in a nontransitory computer-readable medium, wherein the instructions include:
charging, by a vehicle, a battery of a secondary transportation apparatus, during a vehicle portion of a route, the vehicle including an onboard electronic control module;
authenticating, by a processor of the electronic control module, a user, based on image data obtained by an interior camera;
in response to receiving an integrated transportation request, determining, using the processor of the electronic control module, a route based on (i) at least one of a location of the vehicle and the user, and (ii) a destination associated with the integrated transportation request;
displaying, on a display of the vehicle in communication with the processor, a graphical user interface element prompting the user to indicate whether to use a secondary transportation apparatus;
receiving input from the user indicating whether to use the secondary transportation apparatus;
in response to the input from the user indicating to use the secondary transportation apparatus:
determining, using the processor of the electronic control module, the vehicle portion of the route and a secondary transportation apparatus portion of the route based on a depletion time of a battery of the secondary transportation apparatus or a battery level of the battery, the depletion time and battery level being determined based on the charging of the battery during the vehicle portion of the route, and at least one of (i) the location, (ii) the destination, (iii) an integrated transportation history associated with the user, and (iv) traffic information retrieved from a mapping application;
instructing the display of the vehicle in communication with the processor to display navigation instructions for the vehicle portion while the vehicle is operating during the vehicle portion; and
transmitting, using the processor of the electronic control module, the secondary transportation apparatus portion to a portable device associated with the user; and
displaying, on a display of the portable device, navigation instructions for the secondary transportation apparatus portion while the secondary transportation apparatus is operating during the secondary transportation apparatus portion;
wherein: the vehicle is an automobile and the secondary transportation apparatus is an electric vehicle that is stored inside of the automobile during the vehicle portion of the route.

11. The system of claim 10, wherein the integrated transportation history associated with the user of the vehicle includes information representing at least one of (i) a frequency of integrated transportation requests and (ii) distance information associated with secondary transportation apparatus portions of previous integrated transportation sessions.

12. The system of claim 11, wherein the distance information is defined by the user.

13. The system of claim 10, wherein the traffic information represents at least one of a vehicle traffic density associated with the location and the destination.

14. The system of claim 10, wherein: the depletion time is based on an amount of time that a vehicle battery will provide power to the secondary transportation apparatus during the vehicle portion; and the battery level is based on the amount of time that the vehicle battery will provide power to the secondary transportation apparatus during the vehicle portion.

15. The system of claim 10, wherein the secondary transportation apparatus is one of a scooter and a bicycle.

16. The system of claim 10, further comprising a vehicle battery configured to provide power to a battery of the secondary transportation apparatus while the user is operating the vehicle.

17. The system of claim 10, wherein the instructions further comprise, in response to completing the vehicle portion, transmitting the secondary transportation apparatus portion to at least one of the portable device and the secondary transportation apparatus.

18. The system of claim 10, wherein the instructions further comprise receiving the integrated transportation request via one of the display of the vehicle and the portable device.

* * * * *